(12) United States Patent
Huang et al.

(10) Patent No.: US 7,144,165 B2
(45) Date of Patent: Dec. 5, 2006

(54) FIBER SPLICER

(75) Inventors: Wei-Ping Huang, Spanga (SE); Ellef Hersoug, Stockholm (SE); Tomas Adeback, Jarfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/502,384

(22) PCT Filed: Feb. 26, 2003

(86) PCT No.: PCT/SE03/00323

§ 371 (c)(1),
(2), (4) Date: Jan. 10, 2005

(87) PCT Pub. No.: WO03/073142

PCT Pub. Date: Sep. 4, 2003

(65) Prior Publication Data

US 2005/0117856 A1    Jun. 2, 2005

(30) Foreign Application Priority Data

Feb. 26, 2002    (SE) .................................... 0200568

(51) Int. Cl.
*G02B 6/255*    (2006.01)
(52) U.S. Cl. ........................... 385/96; 385/95; 385/97; 385/98
(58) Field of Classification Search ............. 385/95–98
See application file for complete search history.

(56) References Cited

U.S. PATENT DOCUMENTS 4,547,650 A * 10/1985 Arditty et al. ......... 219/121.65
4,802,729 A * 2/1989 Rivoallan et al. ............. 385/97
5,161,207 A * 11/1992 Pikulski ....................... 385/96
5,339,380 A   8/1994 Wysocki et al. ............ 385/136
6,411,759 B1 * 6/2002 Beguin et al. ................ 385/49

FOREIGN PATENT DOCUMENTS

DE    19722415 A1    12/1998

OTHER PUBLICATIONS

Swedish Patent Office, International Search Report for PCT/SE03/00323, dated Apr. 30, 2003.

* cited by examiner

*Primary Examiner*—Sung Pak
*Assistant Examiner*—Daniel Petkovsek

(57) ABSTRACT

Optical fibers (1, 1') are fusion spliced to each other by using a CO2 laser (109) having an emission wavelength of 9.3 microm. The heat absorption of the fibers is higher and the variation of the absorption for small deviations of the wavelength is smaller than at the conventional wavelength of 10.6 microm. As a result, less laser power is needed, the laser construction may be more compact and safety problems can easier be handled. The optical arrangement for the light beam of the CO2 laser includes deflecting and focusing the collimated laser beam (20) emitted by the laser using a mirror (10) having a curved surface of concave nearly paraboloid shape, the splice position (30) located at a small distance of the focus of the mirror and well outside the collimated beam.

19 Claims, 4 Drawing Sheets

FIBER SPLICER

RELATED APPLICATIONS

This application claims priority and benefit from Swedish patent application No. 0200568-4, filed Feb. 26, 2002, the entire teachings of which are incorporated herein by reference.

FIELD OF THE INVENTION

The present invention relates to splicing optical fibers by fusion using heat obtained from infrared light emitted by a laser.

BACKGROUND

Splicing optical fibers using laser light can be traced back to the pioneering work two decades ago, see K. Kinoshita and M. Kobayashi, "End preparation and fusion of an optical fiber array with a $CO_2$ laser", Appl. Opt., Vol. 18, No. 19, pp. 3256–3260, 1975, and H. Fujita, Y. Suzaki and A. Tachibana, "Optical Fiber Wave Splitting Coupler", Appl. Opt., Vol. 15, No. 9, pp. 2031–2032, 1976. The concept using a $CO_2$ laser as a heat source for splicing optical fibers was disclosed in French patent FR-2323646, May 21, 1977, inventors Hiroyuki Fujita et al. Apparatus designed for splicing trunk fibers and multi-fibers using a $CO_2$ laser was invented in 1981 and 1982, respectively, see U.S. Pat. No. 4,288,143, Sep. 8, 1981, for Pietro Di Vita et al., and U.S. Pat. No. 4,350,867, Sep. 21, 1982, for Kyoichi Kinoshita et al. An automated laser splicing system was introduced in 1991, see U.S. Pat. No. 5,016,971, May 21, 1991, for Hui-Pin Hsu et al. A number of extended applications related to techniques of laser splicing were also proposed, e.g. restoring carbon coating films on optical fibers using reactant gas and laser to improve tensile strength and fatigue, see U.S. Pat. No. 4,727,237, Feb. 23, 1988, for Christopher A. Schantz, achieving high-strength splices with the assistance of sulphuric acid stripping and laser, see U.S. Pat. No. 4,971,418, Nov. 20, 1990, for Carl S. Dorsey et al., and repairing micro-cracks in and improving the mechanical strength of aged fibers with laser light, see U.S. Pat. No. 5,649,040, Jul. 15, 1997, for Göran Ljungqvist et al.

Fusion splicing using laser light has many advantages over conventional methods, such as methods of fusion splicing using the heat in an electric arc, mechanical splicing, splicing using a hydrogen/oxygen flame, etc. This is because the laser can deliver an intense light beam of high energy and having a high uniformity and repeatability in a very localized area and therefore it can be used for processes requiring a high accuracy, e.g. for high precision cutting of optical fibers, see the published European Patent Application No. 0987570, inventor Henricus Jozef Vergeest. Due to the absence of electrodes or filaments such as used in fusion processes using an electric arc, the laser is considered to be a "clean heat source" which does not contaminate splicing joints and it is, therefore, believed to be the most suitable heat source for high-strength splicing.

Though significant progress in splicing technology using laser light was achieved in the past two decades, industrial applications of laser splicing of optical fibers are still limited. No commercial laser splicers are, at present, available in the market. This might be due to primarily technical reasons, e.g. high demands on the quality of laser beam, on the beam alignment and control systems, on the protection of operators to the laser radiation, etc., and a poor understanding of the rather complicated nature of splicing processes using laser light. Thus, there is a need in the art to establish general concepts of the way in which a fusion splicer should be constructed that uses laser light and allows that controllable fusion processes can be automatically performed in order to handle different fusion processes for all types of optical fibers. The design of a splicer using laser light should also fulfill the requirements for large-scale manufacture, e.g. the splicer should be small, compact, robust, totally safe for operators and it should be easily served and maintained.

The understanding of the fusion process of splicing using laser light is very important for constructing a splicer using laser light. In a conventional splicer, e.g. a fusion splicer using an electric arc, the high temperature needed for splicing, over 1800° C., is mainly obtained by an electric arc that creates a plasma from residue gases, e.g. air, surrounding the optical fibers, whereas the fusion processes using laser light can be mainly attributed to strong absorption of the energy of the laser light directly in the fibers to be spliced. The experimental evidence for supporting the process of optical absorption in splicing using laser light is the weak dependence of fusion temperature on changes of environment, e.g. altitude, humidity etc., and the strong dependence on the operating wavelength of the laser sources used.

Light emitted by $CO_2$ lasers is known to be strongly absorbed by many complex substances, e.g. paper, wood, ceramics, plastic, glass, liquids, granite etc. To date, the $CO_2$ laser is the only laser practically used for splicing optical fibers. In conventional systems, $CO_2$ lasers having an operating wavelength of 10.6 μm are used. FIG. 1 shows infrared absorption spectra obtained from germania-doped silica glass, $GeO_2$—$SiO_2$, phosphosilicate glass, $P_2O_5$—$SiO_2$, borosilicate glass, $B_2O_3$—$SiO_2$, and fused silica, see H. Osanai, T. Shioda, T. Moriyama, S. Araki, M. Horiguchi, T. Izawa, and H. Takata, "Effect of Dopants on Transmission Loss of Low-OH-Content Optical Fibers", Electron. Lett., Vol. 12, No. 21, pp. 549–550, 1976. It can be observed that at the wavelength of 10.6 μm, a relative weak absorption of about 15% is obtained for silica glass. From close inspection it is found that, at this wavelength of 10.6 μm, the absorption strongly depends on the different dopants in the fibers and the absorption varies in the range of 10–30%. This means that fusion processes and the physical characteristics and parameters thereof are strongly dependent on the actual type of fibers to be spliced, e.g. the homogeneity of and the quantity of different dopants in the fibers. Furthermore, since the wavelength of 10.6 μm is located in a region where the absorption for the mentioned glasses has a very steep change with the wavelength, small deviations of wavelength, that for example are obtained in the manufacture of $CO_2$ lasers—typically there exists a deviation of about ±0.3 μm—can result in up to 20% drift in absorption. This implies that the optimized fusion parameters may work perfectly for one splicer, and that they might be completely unapplicable in another splicer. Therefore, in order to achieve large-scale manufacture of identical splicers, high demands on the manufacture of identical lasers have to be set, e.g. requiring a high accuracy as to the operating wavelength and a high stability as to optical power issued, which might not be realistic.

Various optical arrangements for splicers using laser light have been proposed in the art, see e.g. U.S. Pat. No. 5,161,207, Nov. 3, 1992, for Joseph L. Pikulski, and U.S. Pat. No. 5,339,380, Aug. 16, 1994, for Joseph A. Wysocki et al. In these patents two types of beam expanders and beam forming apparatus are disclosed. The first patent mentioned uses movable mirrors to deflect a collimated beam to form a diverging conical beam, which is then reflected by a paraboloid mirror to form a convergent conical beam that is in turn focused towards the optical fiber. The second patent uses a beam expander to expand the beam width of a collimated beam, which is then reflected by a paraboloid mirror that focuses the beam towards the fiber joint. For both these patents the splice position of the fibers is located inside the unfocused part of the beam. For the first patent, an indirect alignment of the beam emitted by the $CO_2$ laser is performed by visual observation of the beam of a helium-neon laser of low power. The beam of the helium-neon laser may then be switched alternately into the same beam path as that of the of $CO_2$ laser via a removable mirror. When this mirror is in place it also blocks the light from the $CO_2$ laser, if any. For the second patent the alignment of the $CO_2$ laser beam is controlled by sensing the amount of light that is emitted by the $CO_2$ laser and is scattered to the side from the splice position.

SUMMARY

It is an object of the invention to provide an efficient method of fusion splicing optical fibers using laser light.

It is another object of the invention to provide a stable and compact device for fusion splicing optical fibers using laser light.

It is another object of the invention to provide a device for fusion splicing optical fibers using laser light and having efficient arrangements for aligning the laser beam with the fibers to be spliced to each other.

It is another object of the invention to provide a device for fusion splicing optical fibers using laser light and having appropriate safety precautions for the beam.

Thus, for splicing optical fibers to each other, light from a $CO_2$ laser is used in which a specially selected operating wavelength is used. In particular light of a wavelength in the deep infrared range is used where heat absorption by the glass material of typical optical fibers is sufficiently high. For the fusion splicing a $CO_2$ laser preferably operating at the wavelength 9.3 μm is used, this wavelength being selected to give absorption that is higher and has a smaller dependence on small variations of the wavelength than for a $CO_2$ laser operating as conventional at the wavelength 10.6 μm. The wavelength of 9.3 μm gives nearly maximum absorption for many glass materials. As a consequence of the high absorption, the laser can have a reduced power and the laser light produced a smaller intensity. Thereby, such a laser has lower fabrication costs and also it is more manageable from a safety point of view.

Also, the region at the joint to be made between the two fibers to be spliced can be placed well outside of the main, direct beam of the laser. This is made possible by deflecting the laser beam by a concave mirror having e.g. a nearly paraboloid shape that makes the laser beam converge in the direction of the joint, thereby at the same time increasing the power density of the beam at regions at the joint. No other modification and formation of the beam is necessary to achieve a suitable spot size of the laser beam at the joint. This gives the laser splicer a simple structure compared to $CO_2$ laser splicers according to prior art.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 3:
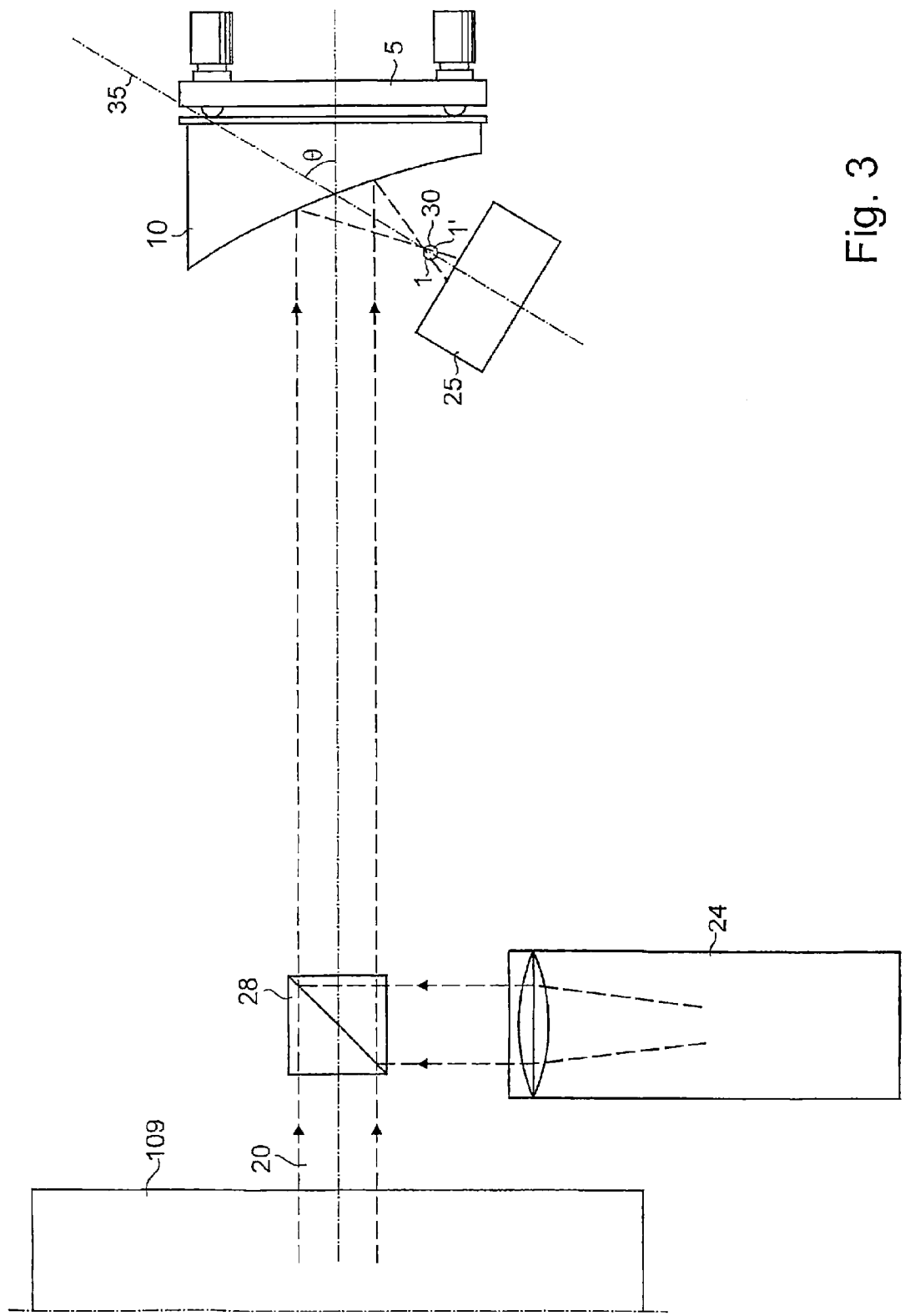
FIG. 3 is a schematic view of the optical system in a laser splicer for beam alignment and transmission.

The transmission paths of the light rays in a fusion splicer using laser light for heating ends of the fibers to be spliced to each other are shown in FIG. 3. A $CO_2$ laser 109 delivers a direct, collimated light beam 20 having a diameter in the range of 2–4 mm, preferably substantially 3 mm. A beam combiner 28 including a semi-transparent mirror is placed in the direct beam from the $CO_2$ laser and allows the light in the direct beam to pass essentially unaffected therethrough. The beam combiner 28 has an inner reflecting surface located in an angle of 45° to the direct laser beam. The angled surface reflects light from a pointing light source such as a laser diode assembly 24 to pass in the center of and parallel to the beam of the $CO_2$ laser for alignment purposes. The direct light beams issued by the pointing light source 24 and the $CO_2$ laser 109 are thus directed perpendicularly to each other, and the tilt angle of the reflecting surface or semi-transparent mirror inside the beam combiner 28 in relation to the direct beams is 45°. The direct beam 20 issued by the $CO_2$ laser continues towards and hits a mirror 10 having a concave surface of nearly paraboloid shape. One suitable design of this mirror is a so-called off-axial paraboloid mirror, which has two main optical axes, a center ray axis and a deflected ray axis. The angle θ between these two axes is fixed by the design. In this context an optimum alignment of an off-axial paraboloid mirror is where the center ray axis coincides with to the longitudinal axis of the incident collimated beam of the $CO_2$ laser. As depicted in FIG. 3 both the incident $CO_2$ laser beam and the light beam originating from the laser diode assembly 24 are then reflected along the deflected ray axis. These beams then converge towards a focus located at some small distance, e.g. a few, 3–4, centimeters from the collimated direct beam 20 issued by the $CO_2$ laser and also located at a small distance e.g. in the range of 3–5 cm from the mirror 10. Beyond the focus the convergent beams continue to form divergent beams. The observed diameter of the spot of the reflected beam from the $CO_2$ laser depends on the distance between the spot and the surface of the mirror 10.

Figure 4:
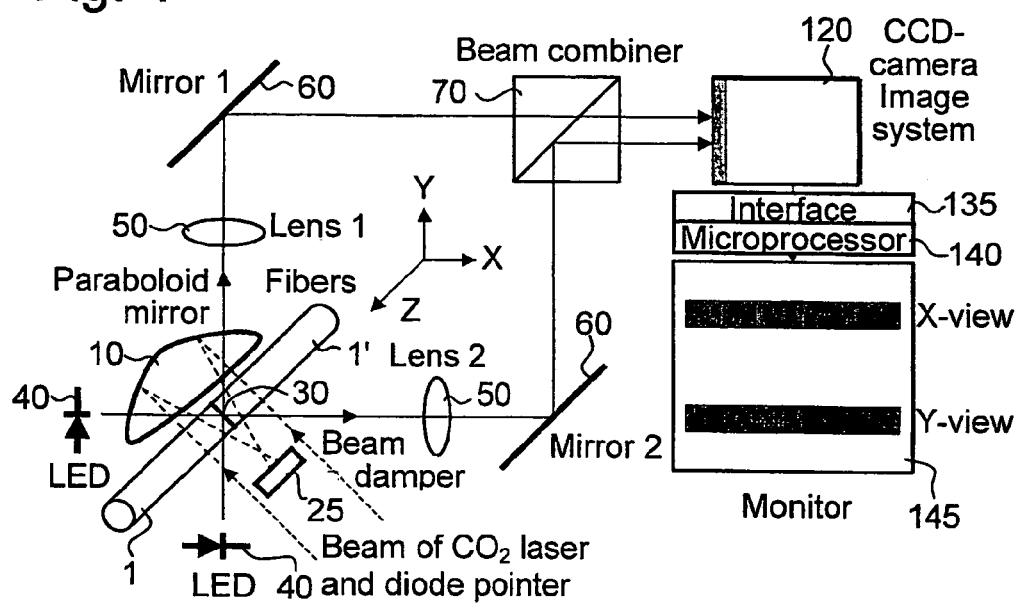
FIG. 4 is a schematic overview of the optical system of a laser splicer.

FIG. 4 is a schematic overview of the optical system of a laser splicer. In FIG. 4 the concave mirror 10 is the only visible component also drawn in FIG. 3. The mirror, which e.g. can be an off-axis paraboloid mirror as indicated above, is seen to be located at the side of the fiber ends to be spliced. A proper adjustment of the mirror 10 about its optical axis 35 can be achieved using a precisely controllable mirror mount 5. This makes the incident beam be reflected by the concave mirror in such a way, see FIG. 3, that a suitable splice position 30 for the ends of the optical fibers 1, 1' is set slightly at the side of, i.e. at a relatively small distance of, the focus region of the $CO_2$ laser beam. The diameter of the light spot of the beam is set to be in the range of 300–500 μm at the splice position 30 in order to obtain a region that is homogeneously heated by the laser beam in both transverse and longitudinal directions of the fiber ends to be spliced. The deflection angle of the $CO_2$ laser beam, i.e. the angle between the longitudinal axis of the direct incident light beam and the center ray through the focus region of the concave mirror is also controlled by the mirror mount 5. In the case of an off-axial paraboloid mirror an optimum deflection angle corresponding to a sharpest possible focus equals the angle θ. A suitable value of the deflection angle is in the range of 45–75°, preferably substantially 60° for the optimum angle. At this angle the distance between the longitudinal axis of the direct incident beam 20 of the $CO_2$ laser and the splice position 30 can e.g. be about 40 mm.

In order to control the alignment process of the light beam from the $CO_2$ laser 109, the collimated light from the pointing light source 24 is used to guide the invisible beam of the laser. The pointing light source comprises a laser diode, not shown, radiating e.g. visible red light at a wavelength of about 650 nm. As has been described above, the light from the pointing light source is directed into the direct light beam from the $CO_2$ laser 109 via the beam combiner 28 that can be made from zinc-selenide, and propagates towards the concave mirror 10, where it is reflected and directed to the splice position 30 of the fibers 1, 1' to be spliced. The geometry of the beam from the pointing light source 24 is everywhere substantially the same as that of the beam from the $CO_2$ laser, i.e. after having been reflected by the beam combiner 28, the light beam from the pointing light source is coaxial with the direct collimated light beam 20 from the $CO_2$ laser and its cross-section is substantially the same as that of the beam 20. When using the alignment beam from the pointing light source 24, the $CO_2$ laser beam is first switched off, so that the alignment can be performed safely at a low optical power. Then, when the $CO_2$ laser is switched on, the same spot size can be expected at the optical fibers 1, 1' to be spliced at the splice position 30 without any further adjustment.

As is conventional and is seen in FIG. 4, the optical system of a laser splicer for alignment of the fiber ends with each other using image analysis includes two light emission diodes, LEDs, 40, two lenses 50, two mirrors 60 and a beam combiner 70. The LEDs 40 are used for illuminating the joint region 30 between the two optical fibers 1, 1' to be spliced. They are furthermore arranged to emit their light in two directions perpendicular to each other and also perpendicularly to the longitudinal direction of the fibers. After passing the fibers 1, 1', the light from the LEDs is focused and collimated by the two lenses 50. The light rays are then deflected by two mirrors 60, directed to the beam combiner 70 and hit a charged coupled device, a CCD-camera 80.

The image processing system includes the CCD-camera 80 comprising an area having light sensitive elements, and a videoboard 120 comprising corresponding control software. The cold and hot images, corresponding to the fibers illuminated by the LED and heated or not heated by the laser beam, respectively, are thus collected via the videoboard 120 and processor interface boards 135 and delivered to a processor 140, in this particular case used for image analysis and processing, but also used for fusion process control. The processed images are displayed on a TV monitor 145. Using intelligent software, the information needed for fiber alignment, e.g. positions of the fiber ends, the fiber orientations, fiber core/cladding offset etc., and the information required for real time control of the fusion process, see e.g. W. Zheng, "Real time control of arc fusion for optical fiber splicing," IEEE J. Lightwave Tech., Vol. 11, No. 4, pp. 548–553, 1993, and also the information needed for splice-loss estimation is extracted and analyzed. The analyzed results are sent to the control system for executing different tasks in the fusion process.

Figure 5:
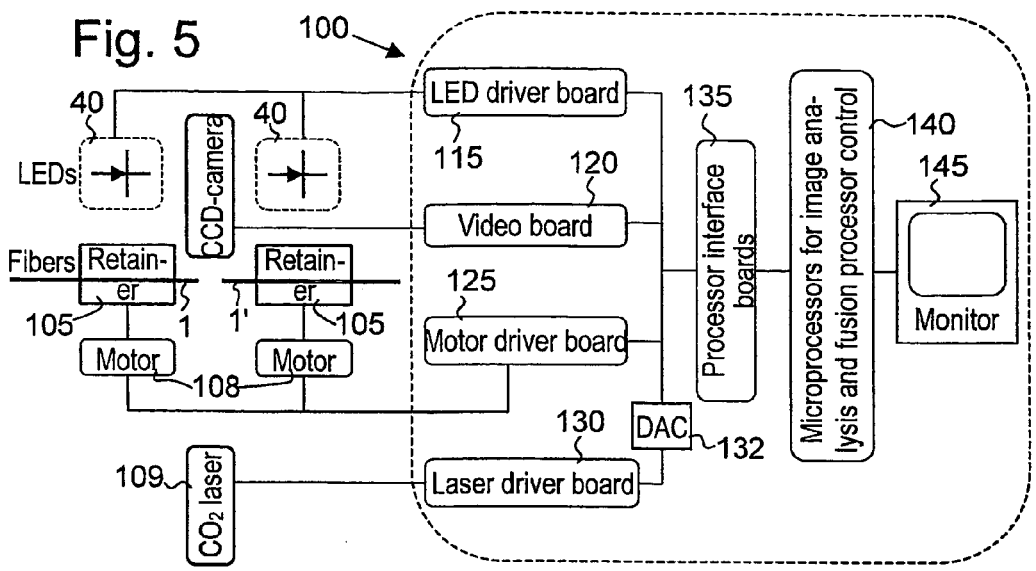
FIG. 5 is a block diagram of the control system of a laser splicer.

FIG. 5 is a schematic view of the control system 100 for the mechanical and electrical adjustment of various components, including those of the fusion splicing process. In the splicer, two retainers 105 are provided, in which the end portions of the fibers 1, 1' are placed and firmly held during the splicing process. The retainers can thus move the fibers in three orthogonal coordinate directions. The retainers are mounted on suitable mechanical guides that are driven by motors 108 controlled by the microprocessor 140 via a driver board 125 and interface 135. The fibers 1, 1' are illuminated alternatingly from two perpendicular directions by the LEDs 40 and as already discussed above, images taken by the CCD-camera 80 are sent to the video board 120, from which the analog signals are converted to digital signals on the interface boards 135 to be processed further by the microprocessor 140. The TV monitor 145 is used for displaying direct and processed images.

The automated fusion processes, e.g. aligning two fibers 1 and 1', setting the mutual boundaries for two prefused, just softened fiber ends, pulling the fiber ends slightly apart during splicing, etc., are synchronized with the power/energy control of the $CO_2$ laser.

Laser action of the $CO_2$ laser 109 can advantageously be achieved by transverse plasma excitation within the laser cavity by pulses of a radio frequency carrier of about 45 MHz. The power/energy control of the laser beam is achieved by pulse width modulation, PWM, of the radio frequency carrier. Based on the characteristics and set parameters of the fusion process, a sequence of modulated signals is generated by the microprocessor 140 and sent to the laser driver 130 via the processor interface boards 135 and a digital to analog converter, DAC 132. These signals are used to switch the $CO_2$ laser on and off at time intervals which are synchronized with the automated fusion processes. By adjusting the PWM on-time percentages, i.e. the PWM duty cycles, the output power and energy of the laser beam is determined, e.g. an output signal of 2 volts from the DAC 132 may correspond to 20% of the PWM duty cycle. An additional "tickle signal" having a clock frequency of 5–20 kHz is also sent to the laser driver 130 for pre-ionization $CO_2$ molecules. The pulse width of the "tickle signal" is around 1 μs. The "tickle signal" excites $CO_2$ molecules into a plasma state without giving rise to laser emission since the pulse width is just below the pulse threshold, the typical value of threshold needed for laser emission being around 3 μs. This feature ensures a nearly instantaneous lasing response to the switch signal discussed above, with a delay less than e.g. 50 ms.

Figure 1:
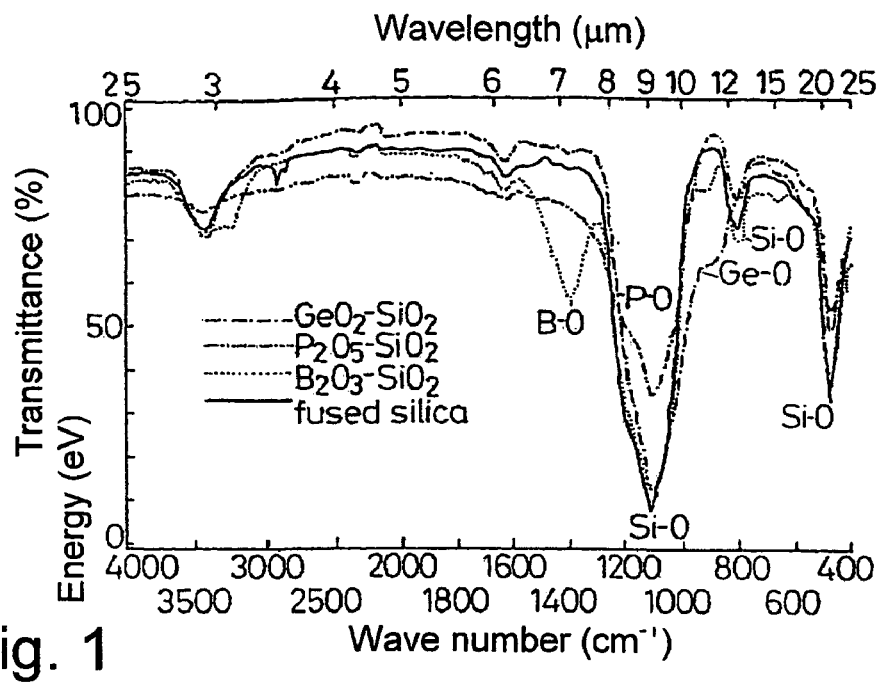
FIG. 1 is a diagram of the transmittance of the glass materials of some typical optical fibers for light as a function of the wavelength in the wavelength range of 2.5–25 μm.
Figure 2:
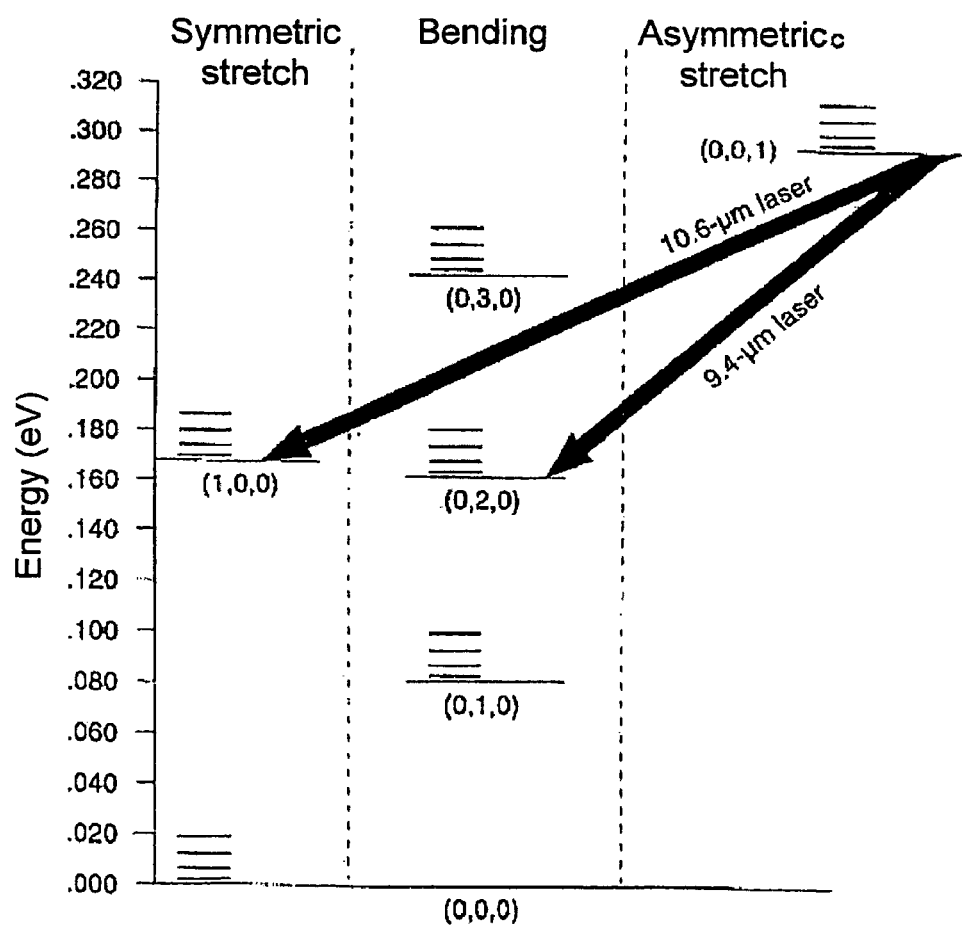
FIG. 2 is a diagram of energy as a function of quantum numbers of vibrational levels of the $CO_2$ molecule, the diagram in particular showing possible laser transitions.

There exist two laser transitions between vibrational levels of the $CO_2$ molecule, see FIG. 2. The transition from symmetric stretch mode (0,0,1) to asymmetric stretch mode (1,0,0) results in laser operation at 10.6 μm, whereas the other transition from symmetric stretch mode (0,0,1) to bending mode (0,2,0) yields laser operation at 9.4 μm. Preferably, a $CO_2$ laser with an operating wavelength of about 9.3 μm is used for splicing. The selection of the lasing wavelength 9.3 μm is made possible by a proper optical and mechanical design of the laser waveguide and also by choosing a suitable gas mixture of carbon dioxide, nitrogen and helium for the laser. Since the wavelength 9.3 μm is located in the middle of the absorption band of silica glass, see FIG. 1, drawbacks in using laser light of the wavelength 10.6 μm can be overcome or at least strongly reduced. From FIG. 1, it can be clearly seen that the absorption is nearly constant for small variations of the wavelength around the wavelength 9.3 μm for the types of fibers the transmittance spectra of which are shown. The absorption is also significantly increased from 15–30% up to 70–90% for different types of fibers when using light of the wavelength 9.3 μm instead of light of the wavelength 10.6 μm. This implies that the demands on the laser source, e.g. power level, power stability, small wavelength deviation etc., are significantly reduced.

Comparison experiments have been performed regarding the damage thresholds, the minimum energy/power required for making a micro-crack on the cladding of a considered optical fiber, using $CO_2$ lasers operated at 10.6 μm and 9.3 μm, respectively, for different types of fibers. The results are summarized in Tables 1 and 2:

TABLE 1

Damage threshold test using 10.6 μm $CO_2$ laser

| Fiber Types (125 μm cladding) | Beam Spot (μm) | Power Density (W/mm$^2$) | Damage Threshold (J/mm$^2$) × 10$^{-3}$ |
| --- | --- | --- | --- |
| Single-mode fiber | 180 | 280 | 42 |
| Erbium-doped fiber | 180 | 280 | 42 |
| Corning LEAF | 180 | 280 | 42 |

TABLE 2

Damage threshold test using 9.3 μm $CO_2$ laser

| Fiber Types (125 μm cladding) | Beam Spot (μm) | Power Density (W/mm$^2$) | Damage Threshold (J/mm$^2$) × 10$^{-3}$ |
| --- | --- | --- | --- |
| Single-mode fiber | 180 | 140 | 15.5 |
| Erbium-doped fiber | 180 | 140 | 14 |
| Corning LEAF | 180 | 140 | 23 |

These data and the absorption data show that the heat efficiency is enhanced for different types of optical fibers by at least a factor of 4, comparing a 9.3 μm $CO_2$ laser to 10.6 μm $CO_2$ laser. Thus the dimensions of the laser can also be reduced by approximately a factor of 4 since the length of laser is proportional to the total output power, assuming that the cross-section of the gassing area for laser excitation is kept the same.

Therefore, when using a $CO_2$ laser operated at the wavelength 9.3 μm to produce a light beam for heating the splice position of optical fibers, also the laser fusion splicer can be constructed to totally have smaller dimensions.

Laser radiation is known in general to be very hazardous to human beings, e.g. eyes and skins. No exception to this exists at a lasing wavelength of 9.3 μm. In the splicer proposed herein, the laser beam is terminated by a graphite beam damper 25 to prevent direct and scattered laser radiation exposure to operators, see FIGS. 3 and 4. The beam damper 25 is located in the divergent portion of the beam, where the optical spot-size is about 1 mm in diameter, after the concave mirror 10 and the fiber splice position 30, and it is attached to a metal radiator, not shown, for heat dissipation. In the active area of the laser beam, e.g. in the splice or fusion region 30, the beam is completely sealed by an interlock system including both mechanical and electric beam shutters, not shown. Indicators, not shown, can also be installed, indicating whether the beam is on or off, and further indicating failure of internal electronics, e.g. the laser control circuits.

Figure 6:
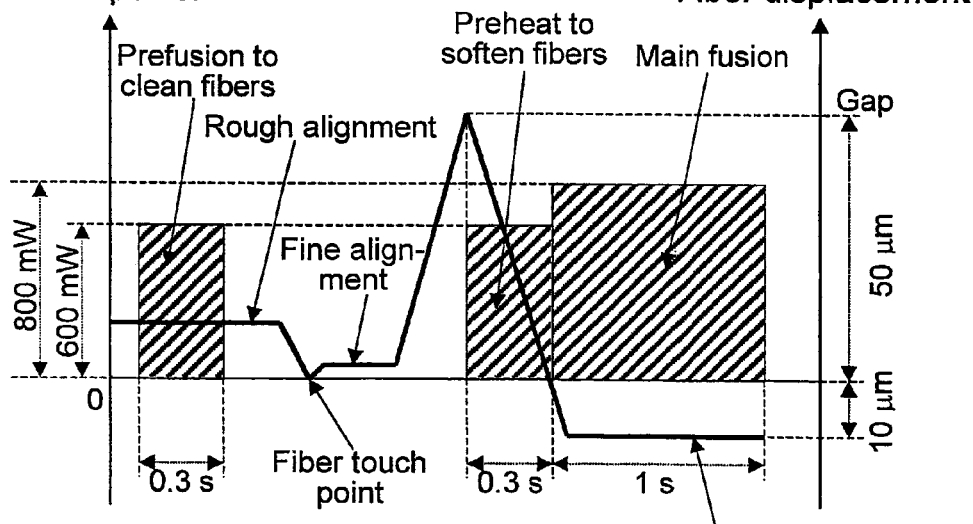
FIG. 6 is a diagram of laser power and the displacement of fiber ends as a function of time, the diagram illustrating the sequential steps used in a laser splicer set to operate with splicing parameters for splicing SM fibers to each other.

FIG. 6 is a schematic diagram illustrating the laser power and distance between fiber ends in a typical sequence of processing steps used for splicing two standard single mode (SM) fibers to each other. After placing two SM fibers in the retainers 105, a process of rough alignment is first executed, moving the fiber ends into the fusion area to have their end surfaces located at a predetermined distance of each other. A laser beam having a relatively low power is ignited for 0.3 seconds in order to remove possible micro-dust remaining on the surface of fiber ends. While analyzing their cold images according to the above discussion, the fiber ends are moved towards each other until a touch point is found. The touch point is defined by a 50% reduction of light intensity between the fiber end surfaces. Then, a fine alignment is performed to minimize the core/cladding offset between two fiber ends, after which the ends are moved apart to a predetermined position at a gap of typically 50 μm, in order to remove hysteresis in the mechanical system. A laser beam of low power is then applied for pre-heating so that the fiber ends become soft and are slightly deformed. At the same time the ends are again made to approach each other, and after a while, the slightly deformed ends will again touch. Then, after a very short instant, when the area of the common boundary between the touching ends becomes sufficiently large, the fusion beam starts. The typical laser power and the typical duration time for the fusion splicing are about 1 W and 1 second, respectively, the laser power generally being in the range of 0.8–1 W.

High performance can be expected when using the splicer as described herein for splicing standard SM fibers. Low splice losses, 0.03 dB at an average, can be experimentally achieved by carefully optimizing the fusion process and the fusion parameters.

One advantage related to the optical arrangement of the present system is that no extensive beam expansion and beam forming is needed, which may cause unnecessary optical attenuation of the beam. The only beam forming operation carried out for the $CO_2$ laser 109 is that obtained by the concave mirror 10, by which the light spot at the splice position may be varied in size and location by the independent change of three coordinates of this mirror, taken with respect to three orthogonal axes, one of which may be parallel to the longitudinal axis of the collimated, direct beam from the $CO_2$ laser. The splice position may thus be located well outside the direct beam, which is a great advantage from a safety point of view. By the above discussion it is also obvious that the laser power requirements of the present system at the wavelength 9.3 μm is much lower than that at 10.6 μm, reduced by at least a factor four. This is also an advantage for safety reasons as has been already mentioned, and also since the laser now may be made much more compact and smaller. Furthermore, also because the beam is subject to less optical attenuation in the splicer described above, the light source for indirect alignment of the $CO_2$ laser beam and contained in the laser diode assembly 24 may be a compact and very low power semiconductor laser, emitting red light in the visual wavelength range.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A device for fusion splicing ends of two optical fibers to each other comprising:
   retainers for optical fibers adapted to hold ends of two optical fibers with end surfaces placed at each other in a splice position;
   a $CO_2$ laser emitting light to the splice position, wherein the emission wavelength of the $CO_2$ laser is substantially 9.3 μm+/−0.4 μm; and,
   a mirror having a curved concave surface located to deflect a collimated direct light beam emitted by the $CO_2$ laser towards the splice position and to make it converge to a focus in the direction of the splice position, the splice position located at a distance of the collimated direct light beam.

2. The device according to claim 1, wherein said concave mirror and the retainers are adapted to make the splice position be located a relatively small distance of a focus of the collimated direct light beam as reflected by the concave mirror.

3. The device according to claim 1, wherein said surface of the concave mirror being an off-axis paraboloid type.

4. The device according to claim 1, wherein the diameter of the collimated direct laser beam emitted by the $CO_2$ laser is in the range of 2 to 4 mm.

5. The device according to claim 1, wherein the maximum power of the $CO_2$ laser is in the range of 0.8 to 1 W.

6. The device according to claim 1, wherein the angle with which the collimated direct light beam of the $CO_2$ laser is deflected by the concave mirror is in the range of 45 to 70°.

7. The device according to claim 1, wherein the collimated direct light beam emitted by the $CO_2$ laser is focused by the concave mirror to a point located 30 to 50 mm in front of the concave mirror.

8. The device according to claim 1, wherein the distance between the center of the light spot at the splice position and a center axis of the collimated direct light beam emitted by the $CO_2$ laser is in the range of 30–40 mm.

9. The device according to claim 1, wherein the diameter of the light spot, produced by light emitted by the $CO_2$ laser and deflected by the concave mirror, at the splice position is in the range of 300 to 500 um.

10. The device according to claim 1, further comprising a beam damping device located to receive and absorb the light that is deflected by the concave mirror and has passed the splice position.

11. The device according to claim 1, further comprising a pointing light source issuing light formed and directed to form a light beam located and formed substantially as the collimated direct light beam emitted by the $CO_2$ laser, being coaxial therewith and having substantially the same cross-section.

12. The device according to claim 11, wherein the pointing light source comprises a laser diode emitting light in the visible range.

13. The device according to claim 12, wherein the operating power of the laser diode is in the range of 5 to 10 mW.

14. The device according to claim 11, further comprising a semi-transparent or semi-reflecting mirror that is placed so that the collimated direct light beam emitted by the $CO_2$ laser passes the mirror and that directs light from the pointing light source to become coaxial with the collimated direct light beam.

15. A method of fusion splicing ends of two optical fibers to each other, comprising the successive steps of:
   aligning the ends to have end surfaces near or in close contact with each other at a splice position;
   forming and directing a collimated direct light beam emitted by a $CO_2$ laser to form a suitable spot at the splice position, the forming and directing being made by observing light emitted by a pointing light source, said light having substantially the same beam location and geometry as the collimated direct light beam emitted by the $CO_2$ laser, wherein the emission wavelength of the $CO_2$ laser is substantially 9.3 μm+/−0.4 μm; and,
   illuminating the splice position by the formed and directed collimated direct light beam emitted by the $CO_2$ laser.

16. The method according to claim 15, wherein in the step of forming and directing the collimated direct light beam emitted by the $CO_2$ laser, the collimated direct light beam is formed and deflected by being reflected by a mirror having a concave surface of the off-axis paraboloid type.

17. The method according to claim 16, wherein in the step of forming and directing the collimated direct light beam emitted by the $CO_2$ laser, the collimated direct light beam is formed and directed by being reflected by a concave mirror having a nearly paraboloid shape.

18. The method according to claim 15, wherein in the step of forming and directing the collimated direct light beam emitted by the $CO_2$ laser, the collimated direct light beam is formed and directed to have a focus located at a relatively small distance of the splice position.

19. The method according to claim 15, wherein in the step of forming and directing the collimated direct light beam emitted by the $CO_2$ laser, the collimated direct light beam is formed and directed to have the spot at the splice position located at a distance of the collimated direct light beam.

* * * * *

UNITED STATES PATENT AND TRADEMARK OFFICE
CERTIFICATE OF CORRECTION

PATENT NO.         : 7,144,165 B2
APPLICATION NO. : 10/502384
DATED              : December 5, 2006
INVENTOR(S)        : Huang et al.

It is certified that error appears in the above-identified patent and that said Letters Patent is hereby corrected as shown below:

On The Title Page, Item (57), under "ABSTRACT", Line 2, delete "CO2" and insert -- $CO_2$ --, therefor.

On The Title Page, Item (57), under "ABSTRACT", Line 9, delete "CO2" and insert -- $CO_2$ --, therefor.

In Column 7, Line 18, delete "10.6 μn" and insert -- 10.6 μm --, therefor.

In Column 7, Line 67, delete "9.3 μn" and insert -- 9.3 μm --, therefor.

In Column 10, Line 2, in Claim 9, delete "um" and insert -- μm --, therefor.

Signed and Sealed this

Eighteenth Day of December, 2007

JON W. DUDAS
*Director of the United States Patent and Trademark Office*